Figure 1:
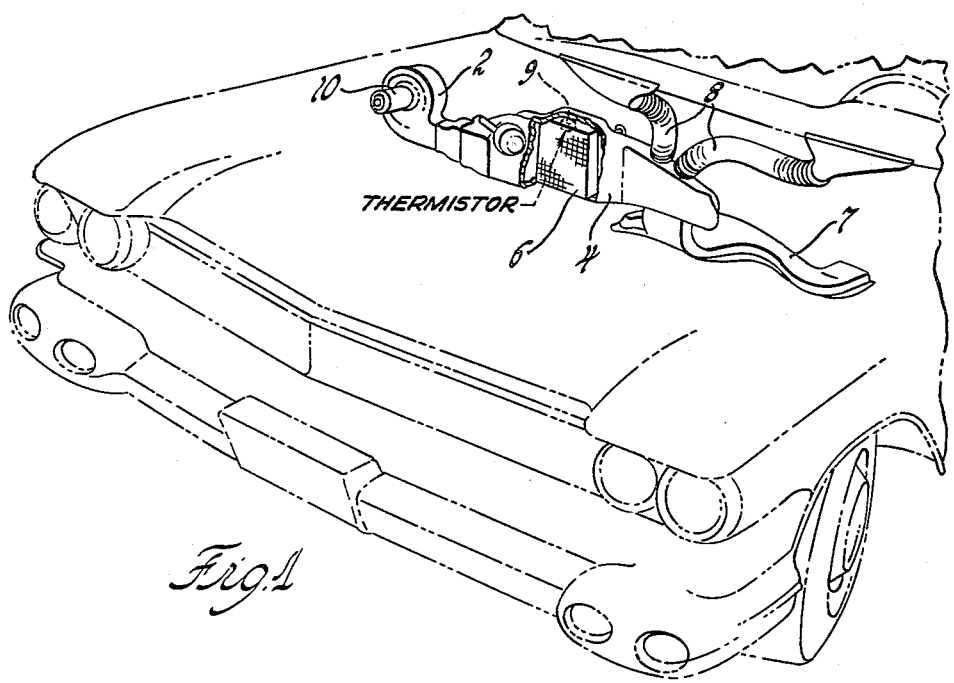

Jan. 21, 1964  G. M. GASKILL ET AL  3,118,603
AUTOMOTIVE HEATING SYSTEMS
Filed Sept. 13, 1960

INVENTORS
George M. Gaskill &
BY  Thomas A. Peewitt
George C. Johnson
ATTORNEY

United States Patent Office 3,118,603
Patented Jan. 21, 1964

3,118,603
AUTOMOTIVE HEATING SYSTEMS
George M. Gaskill and Thomas A. Prewitt, Kokomo, Ind., assignors to General Motors Corporation, Detroit, Mich., a corporation of Delaware
Filed Sept. 13, 1960, Ser. No. 55,684
1 Claim. (Cl. 237—8)

This invention relates to automotive heating systems and more particularly to such systems including controls for automatically regulating the temperature in passenger compartments.

It is customary in heating automobiles to employ engine coolant in heating cores through which air may be forced and heated on its way to the passenger compartments. If the engine coolant has not become sufficiently heated, a condition sometimes arises during which cold air may be directed into a car being served. This, of course, is highly objectionable. Also, if air is not forced through until the engine coolant has reached a high temperature, time is lost before providing some heat to the passenger compartment. Obviously, heat should be supplied as soon as available in useful quantity and as required by conditions obtaining.

An object of the present invention is to provide an improved automotive heating system capable of automatically supplying heat when available from the coolant of an engine in useful quantity and as required or dictated by the temperature condition in a passenger compartment.

A feature of the present invention is a heating system in which electrically operated means for causing a heat carrying medium of the system to flow is automatically rendered effective to a modulated extent dependent upon the amount of heat available from the coolant of an engine as supplied to a heat exchanger.

These and other important features of the invention will now be described in detail in the specification and then pointed out more particularly in the appended claim.

Figure 2:
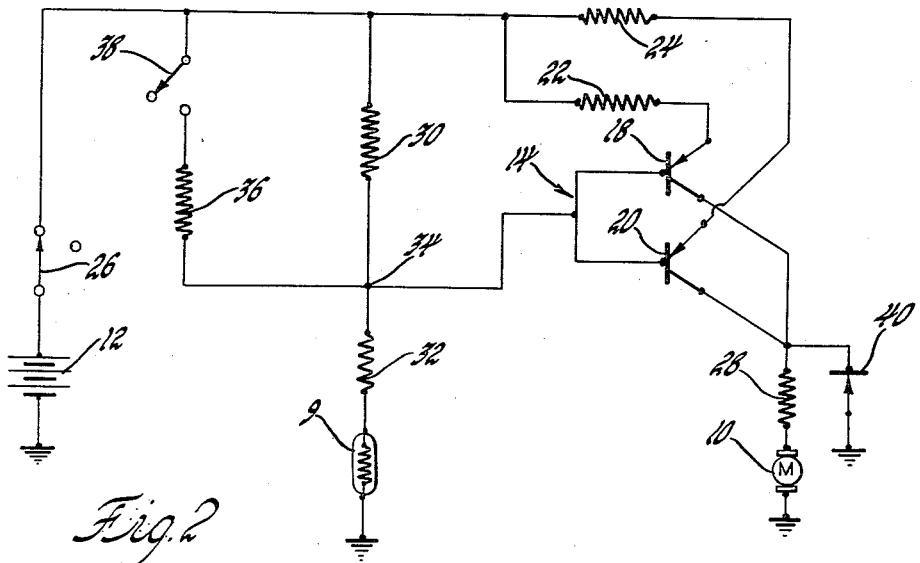

In the drawings:

FIGURE 1 is a perspective phantom view of the front portion of an automobile, a heating system being shown installed thereon as one embodiment of the present invention, a part of the heating system duct work being broken away better to illustrate a detail of the arrangement; and FIGURE 2 is a diagrammatic representation of a circuit utilized with the heating system of FIGURE 1.

In FIGURE 1, a blower 2 is mounted on the forward side of a fire wall separating the engine compartment from the passenger compartment. Duct work 4 is closely associated with the fire wall and encloses a heat exchanger core 6 through which outside air may be directed on its way to the passenger compartment by way of a floor duct 7 and windshield defroster conduits 8. A thermistor 9 is mounted in thermal contact with the core and is thereby subjected to the temperature of engine coolant circulated through the core.

In order to control automatically the starting of the blower motor and its running speed in accordance with the temperature of the heater core, the control circuit of FIGURE 2 is provided. In the control circuit, the blower motor 10, suitably a series wound variable speed motor, is energized from the vehicle battery 12 through a transistor amplifier 14 which is controlled by a temperature responsive element such as the thermistor 9. The transistor amplifier includes a pair of transistors 18 and 20 connected in parallel to provide sufficient current carrying capacity for the blower motor but, of course, a single transistor may be employed, provided that its power rating is adequate for the selected blower motor. Both transistors are of the PNP junction type and are connected in a common emitter circuit configuration. The emitter electrodes of transistors 18 and 20 are connected respectively through load equalizing resistors 22 and 24 to the positive terminal of the battery through an on-off switch 26. The collector electrodes of the transistors are connected together and through the field winding 28 and armature 10 of the motor and through ground to the negative terminal of the battery. In order to provide a control voltage which varies in accordance with radiator core temperature, there is provided a voltage divider network comprising resistors 30 and 32 in series with the thermistor 9 connected across the battery 12 through the switch 26. The junction 34 of resistors 30 and 32 is connected directly to the base electrodes of the transistors 18 and 20. The thermistor 9 has a negative temperature coefficient so that its resistance decreases with an increase in temperature and the value of the thermistor resistance at a selected core reference temperature is correlated with the resistance values of resistors 30 and 32 so that the bias voltage developed at junction 34, which is connected to the base electrodes, is sufficiently positive with reference to the emitter voltage that the amplifier output current flowing to the motor 10 is insufficient to start the motor. In order to provide two ranges of speed for the motor, a resistor 36 is connected in parallel with the resistor 30 through a selector switch 38. To protect the transistor against excessive inverse voltages which might arise from collapse of the motor field upon deenergization thereof, a semiconductor diode 40 is connected in parallel with the motor windings. The polarity of the diode is such that it blocks the flow of current from the battery. Thus the energy of the field windings, when the motor is deenergized, will be dissipated by a circulating current in the forward direction through the diode.

In operation, with the on-off switch 26 closed, the battery voltage will be applied across the voltage divider network including the thermistor 9 and the transistor emitter electrodes will be biased in the forward direction from the positive terminal of the battery and the collector electrodes will be biased in the reverse direction from the negative terminal of the battery through ground and the windings of the motor. With the heater core at the selected cold reference temperature and the selector switch 38 opened for operaiton in the high speed range, a voltage is developed across resistor 30 which biases the emitter and base electrodes of the transistors at a predetermined value. This bias voltage at the reference cold temperature is insufficient to cause the output current conduction between emitter and collector electrodes of the transistors to attain a value sufficient to start the motor. As the temperature of the thermistor increases slightly above the reference temperature due to rise in circulating coolant temperature, the resistance of thermistor 9 will decrease causing the input voltage across resistor 30 to increase and hence, the output current through the motor windings will increase sufficiently to start the motor running. As the coolant temperature increases further, the resistance of thermistor 9 will continue to decrease and the input voltage and the motor speed will continuously increase. The input voltage to the transistors across the resistor 30 will increase toward a limiting value determined by the relative values of resistors 30 and 32 so that the motor speed is limited accordingly, even though the temperature continues to increase. When the temperature of the thermistor 9 decreases by reason of lower heater core or engine coolant temperature, the resistance of the thermistor will then increase and the input voltage across resistor 30 will drop causing a resultant decrease in the output current through the motor and reduce the motor speed accordingly.

For operation in the lower speed range, the selector switch 38 is closed so that the voltage at junction 34 applied to the base electrodes becomes more positive due to the change in total resistance in the divider network.

Consequently, with the thermistor 9 at the reference cold temperature, the input voltage will be decreased and the output current through the motor windings will be correspondingly decreased. As a result, a larger temperature increase from the reference value will be required to start the motor running than in the case of the high speed operation. As the temperature increases beyond this point, the motor speed continuously increases until a limiting value is reached as determined by the relation between the resistance value of parallel resistors 36 and 30 and the resistance value of resistor 32. Otherwise, the operation is identical to the high speed operation.

The system has reference to the blower motor 10 as the specific means for causing the specific heat carrying medium, which is air, at the required rate to satisfy heating requirements. It will be appreciated that with this system an infinitely variable blower speed is provided and the undesired cooling effect resulting from the operation of other systems when they switch full "on" before the radiator core comes up to high temperature is avoided. A pump or valve regulating the flow of engine coolant through the core 6 could be controlled in a way similar to that disclosed herein for the control of the blower motor 10 but other controls must be employed, in such an event, with regard to the blower in order to avoid the cooling effect referred to.

In this system, as herein disclosed, the blower 2 is held inoperative until the core 6 temperature has risen to approximate 70° F. The blower 2 then starts and operates at a low speed and the speed increases proportionately as the core temperatures rises. When the car interior has become heated sufficiently and the valve or damper controlling the flow of engine coolant to the heater core or heat exchanger has been partially closed manually or thermostatically, the rate of coolant flow through the heat exchanger will decrease. When the rate of coolant flow through the core reduces, the air flow through the core 6 will remove a greater percentage of the heat in the core and the temperature of the core will decrease causing a corresponding decrease in the blower motor speed. This decrease in the core temperature becomes greater at points on the core downstream from the core engine coolant inlet. It is apparent that moving the sensing element or thermistor 9 downstream with respect to the engine coolant flow and on the core 6 will produce a successively greater decrease in blower speed at the conclusion of an initial warm-up period. Thus, by relocating the sensing point on the core, blower performance characteristics may be varied over a wide range to accommodate specific installations.

The specific mode of admission of outside air to the blower 10 may be varied without departing from the spirit of the present invention. The air may be admitted by way of a conduit from the front of the vehicle in the neighborhood of the radiator. It is preferred, however, to obtain the outside air from a side or shroud chamber formed in the vehicle body. Such a chamber is disclosed in the United States Patent 2,852,997, granted September 23, 1958, in the names of Leslie, Fox and Premo.

FIG. 1 depicts a heater core 6 of a type conventionally used in transferring heat from the coolant of a liquid-cooled engine to air but it should be appreciated that the engine coolant utilized as the source of heat in practicing the present invention could be air as received from an air-cooled engine and the core 6 could be an air-to-air heat exchanger.

We claim:

An automotive heating system including duct work for conveying air to a passenger compartment, a blower for forcing said air into said duct work, a motor for said blower, a core in the form of a liquid-to-air heat exchanger in said duct work, a source of electrical power, a thermistor located in thermal contact with engine coolant serving as a liquid flowing through said core, a transistor amplifier connected to the motor and controlling the flow of current therethrough, and biasing means connected to the transistor amplifier and to the source of electrical power including said thermistor so that, as the temperature of the engine coolant changes, the bias on the transistor amplifier changes to vary the speed of the motor.

References Cited in the file of this patent

UNITED STATES PATENTS

| | | |
|---|---|---|
| 1,919,743 | Peters | July 25, 1933 |
| 2,291,543 | Findley | July 28, 1942 |
| 2,505,597 | Weiser | Apr. 25, 1950 |
| 2,872,595 | Pinckaers | Feb. 3, 1959 |